Jan. 3, 1967 E. E. KNOWLES ETAL 3,295,899
CAGE FOR ROLLING BEARINGS
Filed Jan. 8, 1965 2 Sheets-Sheet 1
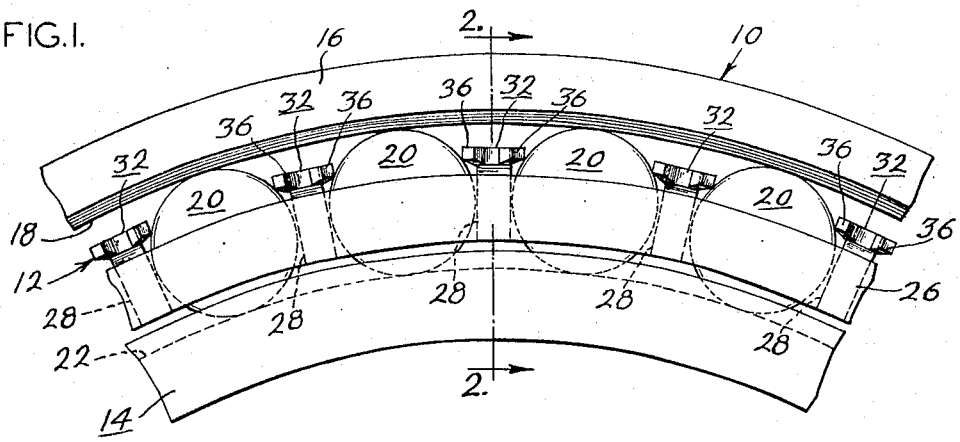
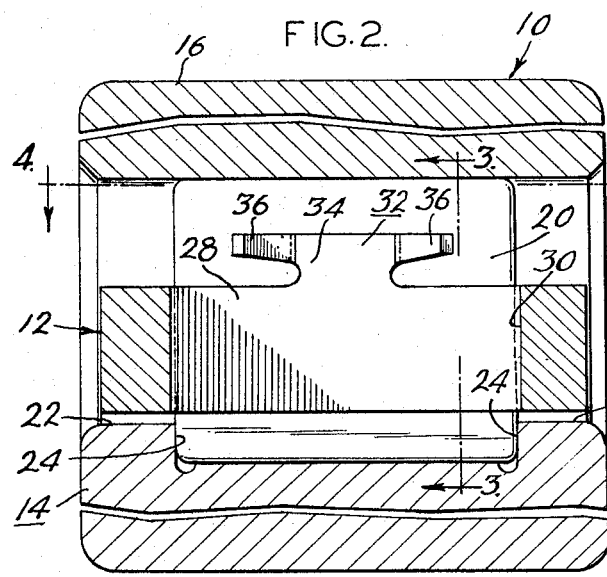
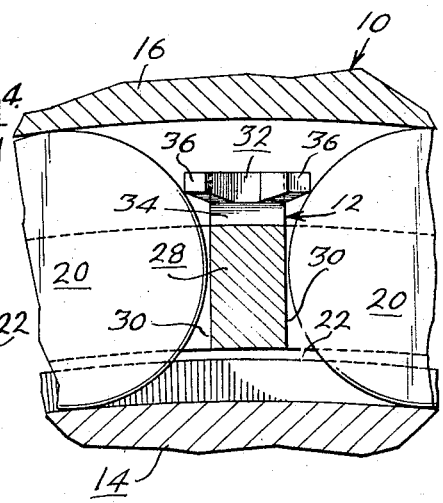
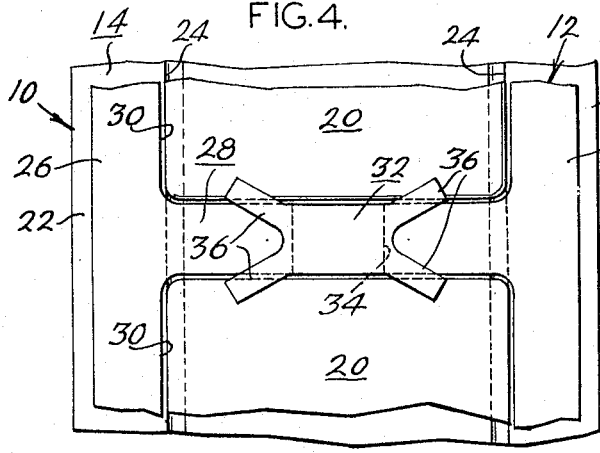
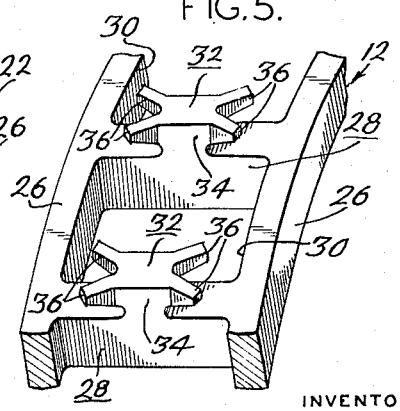
INVENTORS:
ELMER E. KNOWLES
EDGAR L. GARVIN
BY
Howson & Howson
ATTYS.

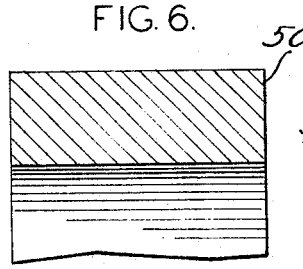
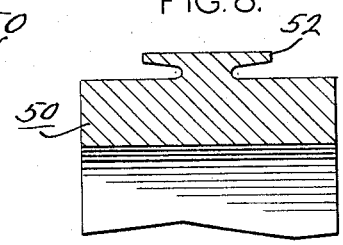
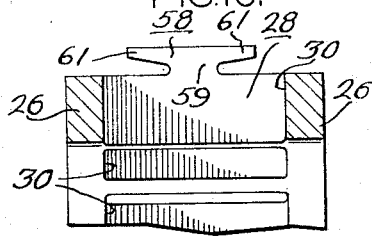
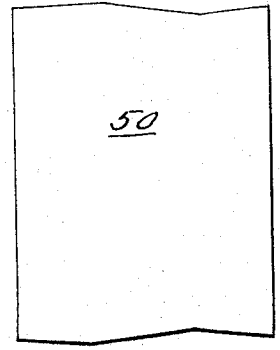
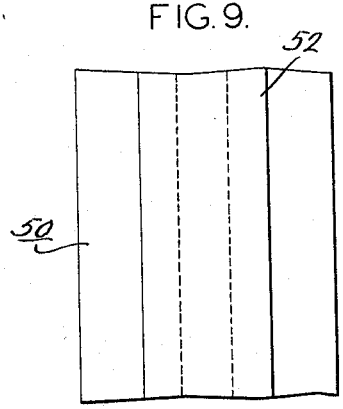
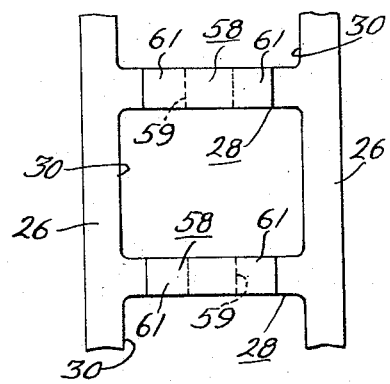
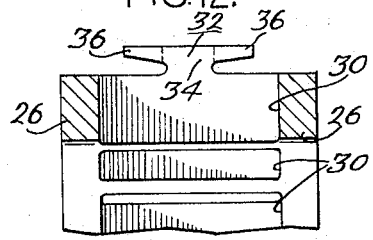
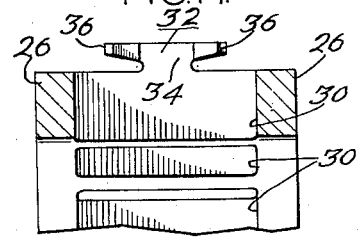
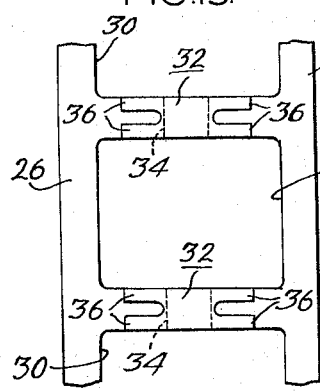
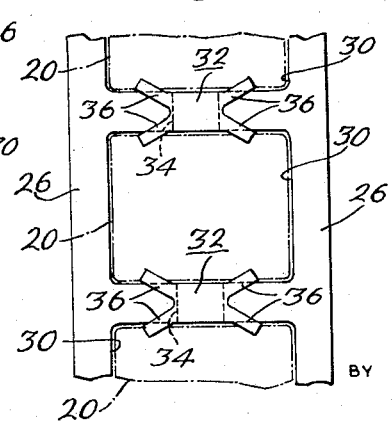

United States Patent Office 3,295,899
Patented Jan. 3, 1967

3,295,899
CAGE FOR ROLLING BEARINGS
Elmer E. Knowles, Williamstown, N.J., and Edgar L. Garvin, Center Square Garden, Pa., assignors to SKF Industries, Inc., King of Prussia, Pa., a corporation of Delaware
Filed Jan. 8, 1965, Ser. No. 424,391
4 Claims. (Cl. 308—217)

This invention relates to a new and improved one-piece cage for rolling bearings adapted to guide the rolling elements in the bearing assembly and to a novel method for making the cage.

Some prior cages for rolling bearings comprise a pair of annular members and a plurality of cross pieces or webs which connect the annular members in spaced apart relation and which cross pieces are circumferentially spaced apart defining pockets for the rolling elements. Each of the cross pieces is provided with a pair of circumferentially directed projections or lugs approximately centrally thereof which extend into the pockets so that the distance between confronting projections is slightly less than the diameter of one of the rolling elements thereby to limit radial displacement of the roller in one direction. The lugs are disposed at one side of the pitch circle of the set of rolling elements, for example, radially outwardly of the pitch circle thereby to limit radial outward displacement of the rolling elements. These lugs are usually formed by deforming the cross pieces, for example, by peening. Thus, in assembling a bearing employing this type of cage, the cage is positioned over, for example, the inner ring, and the rolling elements are then inserted into the pockets. Thereafter, each of the cross pieces is deformed by peening to provide the lugs in the present instance to limit radial outward displacement of the rolling elements. Thereafter, the outer ring is assembled to complete the assembly operation.

This type of prior cage has several disadvantages or drawbacks. For example, in assembling the rolling bearing, the rolling elements have to be held in place while the lugs are being formed on each of the cross pieces. This assembly operation obviously is tedious and time consuming. Moreover, it has been found that the cross pieces are weakened somewhat as a result of deformation thereof to form the projections or lugs resulting in some instances in premature failure of the lugs during operation of the bearing. It is noted that the peening operation to form the lugs may result in distortion of the webs and annular members which adds to the difficulty in controlling roller drop. Additionally, it has been found that it is difficult to accurately control the spacing between confronting lugs and maintain them uniform throughout the cage, thereby making it difficult to maintain uniform roller drop throughout the bearing. Moreover, with the lugs disposed centrally of the rolling elements, the rollers are not supported in an optimum manner to prevent cocking or skewing which adds to the difficulty in assembling elements of the bearing assembly. Also with this type of cage it is difficult to remove the rolling elements for replacement purposes or inspection due to the fact that deformation of the lugs tends to weaken not only the lugs, but also the cross pieces and might even result in damage to other parts of the bearing assembly such as the rolling elements.

With the foregoing in mind, an object of the present invention is to provide a one-piece cage for rolling bearings which is of comparatively simplified construction and a method of making the cage which is easy and economical. The one-piece cage of the present invention is characterized by novel features of construction and arrangement whereby the elements of the bearing assembly may be assembled easily and quickly to provide an accurate support for the rolling elements in a manner whereby rolling element drop may be controlled effectively. To this end, the one-piece cage of the present invention comprises a pair of annular members, a plurality of webs connecting the annular members in spaced apart relation which are circumferentially spaced apart to provide pockets for the rolling elements, each of the webs having a radially projecting slotted anvil member providing four cantilever tabs which are displaceable relative to the pockets to provide a four-point support for the rolling elements. The cantilever tabs are disposed radially to one side of the pitch circle, for example radially outwardly thereof and serve to limit radial outward movement of the rolling elements. Thus, in assembling a roller bearing assembly incorporating a cage constructed in accordance with the present invention, the cage is placed over the inner ring and then the rolling elements are inserted into the pockets of the cage, the cantilever tabs being disposed in a position to permit insertion of the rollers. Thereafter, all of the cantilever tabs are simultaneously displaced in a circumferential direction to overlie the pockets of the cage thereby providing a four-point support for the rolling elements and thereby limiting radial outward movement of the rolling elements. The outer ring is then assembled. This assembly operation is clearly less time consuming and tedious than the operation discussed above. Moreover, it is noted that with the cage of the present invention, displacement of the tabs does not materially weaken or distort either the annular members or the cross pieces. Further, by displacing all of the tabs simultaneously the same amount, roller drop may be controlled more accurately. Additionally with the cage of the present invention, it is relatively simple to remove the rolling elements for inspection or replacement without damaging or weakening parts of the cage.

Another important aspect of the present invention is the provision of a new method for making a one-piece cage in a manner facilitating large quantity production thereof. In accordance with the present invention, the cage may be made from an annular blank first by forming the blank by a machining operation to provide a circumferentially extending rib of anvil shaped cross section projecting from one peripheral surface of the blank and thereafter forming a plurality of circumferentially spaced openings in the blank whereby the pockets for the rolling elements and the webs between the pockets are defined. Also as a result of this operation, a plurality of anvil shaped radial projections are formed on each of the cross pieces. Thereafter the arms of the anvil shaped projections are slotted to provide the pairs of cantilever tabs at opposite axial ends thereof.

With the above in mind, an object of the present invention is to provide a new and improved one-piece cage for a rolling bearing assembly which is of comparatively simplified construction and a method for making such a cage which is simple and economical.

Another object of the present invention is to provide a new and improved one-piece cage having novel features of construction and arrangement facilitating easy and quick assembly of the rolling bearing and which permits removal of the rolling elements for replacement or inspection purposes easily and conveniently without damage to other elements of the bearing assembly.

A further object of the present invention is to provide a one-piece cage for rolling bearings which is rugged and durable and provides an extremely accurate control of rolling element drop in the bearing assembly and wherein the amount of rolling element drop of all of the elements of the bearing assembly may be precisely controlled in a uniform manner.

These and other objects of the present invention and various features and details of the construction of a one-piece cage in accordance with the present invention and the method of making the same are hereinafter more fully set forth with reference to the accompanying drawings, wherein:

FIG. 1 is a fragmentary side elevational view of a rolling bearing assembly including a one-piece cage constructed in accordance with the present invention;

FIG. 2 is an enlarged sectional view taken on lines 2—2 of FIG. 1;

FIG. 3 is an enlarged fragmentary sectional view taken on lines 3—3 of FIG. 2;

FIG. 4 is a fragmentary view taken on lines 4—4 of FIG. 2;

FIG. 5 is a fragmentary perspective view of a portion of the one-piece cage of the present invention;

FIGS. 6 and 7 are fragmentary sectional and plan views respectively of an annular blank from which the one-piece cage of the present invention is adapted to be made;

FIGS. 8 and 9 are fragmentary sectional and plan views respectively of the blank in an intermediate stage;

FIGS. 10 and 11 are fragmentary sectional and plan views respectively of the blank shown in FIGS. 6 and 7 in the next stage of manufacture with the pockets for the rolling elements formed therein;

FIGS. 12 and 13 are fragmentary sectional and plan views respectively showing the finished cage; and FIGS. 14 and 15 are fragmentary sectional and plan views respectively of the finished one-piece cage with rolling elements in the pockets and the cantilever tabs positioned to limit radial displacement of the rolling elements in one direction.

Referring now to the drawings, there is illustrated in FIG. 1 a portion of a rolling bearing assembly 10 including a one-piece cage 12 constructed in accordance with the present invention. In the present instance, the bearing assembly illustrated is a cylindrical roller bearing. However, it is to be understood that the one-piece cage of the present invention has useful application in other types of bearing assemblies.

The rolling bearing assembly illustrated comprises inner and outer rings 14 and 16 respectively which are spaced apart to define an annular space 18 therebetween for rolling elements, in the present instance, rollers 20. In the bearing assembly illustrated, the inner ring 14 has a pair of radially outwardly projecting circumferential flanges 22 at opposite axial ends thereof providing abutment shoulders 24 limiting axial movement of the rollers 20.

In acordance with the present invention, the cage 12 is characterized by novel features of construction and arrangement facilitating easy and quick assembly of the elements of the roller bearing and also supporting the rollers in a manner to minimize cocking and skewing. To this end the cage 12 includes a pair of annular members or rings 26 and a plurality of axial web members or cross pieces 28 which, in the present instance, are formed integrally with the annular members and which are circumferentially spaced apart to define a plurality of pockets 30 for the rollers. The cage 12 is provided with a plurality of anvil shaped projections 32 which, in the present instance project radially outwardly from each of the cross pieces 28 and are disposed centrally thereof as illustrated. The anvil shaped projections 32 are formed integrally with the cross pieces 28 to provide a one-piece cage construction. Each of the anvil shaped projections 32 has a stem or base 34 projecting radially from each of the cross pieces and axially directed bifurcated arms defining pairs of cantilever fingers or tabs 36 at opposite ends of the stem 34. As best illustrated in FIGS. 4 and 5, in the assembled bearing the tabs 36 of each pair diverge outwardly from the stem and are angularly directed relative to one another so that their tip ends overlie the pockets. The tips of confronting pairs of tabs 36 disposed on either side of each of the pockets are spaced apart a distance less than the diameter of the rollers 20 thereby providing a four-point support for the rollers in each of the pockets. The tabs 36 are located at one side of the pitch circle of the set of rollers, in the present instance radially outwardly of the pitch circle thereby to limit radial outward displacement of the rollers 20.

Another important feature of the present invention is the provision of a novel method for making the cage in a highly economical manner to facilitate high volume production thereof. FIGS. 6–15 inclusive show the various successive stages for making a cage in accordance with the present invention. In the method of making a cage in accordance with the present invention, the annular blank 50 as shown in FIG. 6 is suitably formed for example, by machining to provide a circumferentially extending, in the present instance, outwardly projecting continuous rib 52 which is anvil shaped in cross section. (See FIGS. 8 and 9.) Thereafter, a plurality of circumferentially spaced radial openings are formed by suitable machining operation, for example, broaching, to define the pockets 30 for the rollers. At this stage of the process as illustrated in FIGS. 10 and 11, the annular members 26 and cross pieces 28 of the cage are defined. Further by broaching the pockets, each of the cross pieces 28 has a radially outwardly projecting anvil shaped member 58 comprising a stem 59 and axial arms 61 projecting from the stem. Thereafter, as shown in FIGS. 12 and 13, each of the arms 61 of all of the anvil shaped members are slotted to provide the pairs of tabs 36 which are adapted to be spread apart to overlie the pockets (see FIG. 15) and provide the four-point support for the rollers in the assembled bearing.

Accordingly, in assembling a bearing employing a cage constructed in accordance with the present invention, the cage is disposed over the inner ring 14 so that the annular members 26 overlie the peripheral flanges 22. Thereafter, the rollers 20 are positioned in the pockets from the exterior of the cage. It is noted that the tabs or fingers 36 initially are in a closed position, that is, parallel to one another as shown for example in FIG. 13 to facilitate insertion of the rollers 20 into the pockets 30. With all of the rollers in the pockets, the pairs of lugs or fingers 36 at each end of the anvil shaped members 32 are spread apart to the position shown in FIG. 4, so that they project into the pockets as illustrated and thereby provide a four-point support for the roller elements. It is noted that after the lugs or fingers are spread apart, the inner ring 14, cage 12, and rollers 20 form an integral unit. Further it is noted that it is preferred to spread all of the tabs 36 simultaneously a predetermined uniform increment thereby to control roller drop very accurately throughout the entire cage. Thereafter, the outer ring 16 is slipped over the assembly and the assembly operation is completed. When it is desired or necessary to remove the rollers, for example, for inspection or replacement, the tabs 36 are merely bent in toward one another to permit the rollers to clear their tips. It is noted that bending of the tabs in this manner does not weaken the cross pieces or distort the annular members.

From the above, it may be seen that the present invention provides a one-piece cage of comparatively simplified construction which is strong and rigid and which is characterized by novel features for facilitating easy and quick assembly of the roller bearing and which provides an extremely accurate support for the rollers. Further, the cage permits removal of the rollers for replacement or inspection easily and quickly and without weakening parts of the cage, for example, the cross pieces and annular members and without damage to other elements of the cage, for example, the rollers.

While a particular embodiment of the present invention has been illustrated and described above, it is not intended to limit the invention to such disclosure and changes and modifications may be made herein within the scope of the following claims.

We claim:
1. A cage for a rolling bearing assembly having inner and outer spaced apart rings and a plurality of rolling elements in the annular space between the rings comprising a pair of annular members, a plurality of cross pieces between the annular members circumferentially spaced apart to define pockets for the rolling elements, an anvil shaped member projecting radially from each of the cross pieces having a pair of tabs projecting axially from each end thereof, said tabs disposed radially to one side of the pitch circle of the set of rolling elements and adapted to be spread apart to overlie the pockets thereby limiting radial movement of the rolling elements in at least one radial direction.

2. The cage as claimed in claim 1 wherein the tabs are disposed radially outwardly of the pitch circle of the set of rolling elements thereby to limit radial outward displacement of the rolling elements.

3. A cage for a rolling bearing assembly having inner and outer spaced apart rings and a plurality of rolling elements in the annular space between the rings comprising a pair of annular members, a plurality of cross pieces between the annular members circumferentially spaced apart to define pockets for the rolling elements, an anvil shaped member comprising a stem projecting radially outwardly from the central portion of each of the cross pieces, a pair of tabs projecting axially from opposite ends of said stem and spaced radially outwardly of the cross pieces and disposed radially outwardly of the pitch circle of the set of rolling elements, the tabs of each pair adapted to be spread apart circumferentially in opposite directions thereby to overlie partially the pockets and provide a four-point support for the rolling elements limiting radial outward movement of the rolling elements.

4. A rolling bearing assembly comprising in combination an inner ring having a radially outwardly projecting circumferential flange at opposite axial ends thereof, an outer ring spaced radially outwardly from the inner ring to define an annular space, a plurality of rolling elements in the annular space between the rings, a cage for guiding the rolling elements comprising a pair of annular members, a plurality of cross pieces between the annular members circumferentially spaced apart to define pockets for the rolling elements, an anvil shaped member projecting radially from each of the cross pieces having a pair of tabs projecting axially from each end thereof, said tabs disposed radially to one side of the pitch circle of the set of rolling elements and adapted to be spread apart to overlie the pockets thereby limiting radial movement of the rolling elements in at least one radial direction.

References Cited by the Examiner
UNITED STATES PATENTS

| | | | |
|---|---|---|---|
| 1,152,663 | 9/1915 | Schafer | 308—217 |
| 2,657,106 | 10/1953 | Lovell | 308—217 |

MARTIN P. SCHWADRON, *Primary Examiner.*

F. SUSKO, *Assistant Examiner.*